June 29, 1965  R. T. MOORE ETAL  3,191,239
BIRD AND RODENT BARRIER CLIP
Filed April 12, 1963
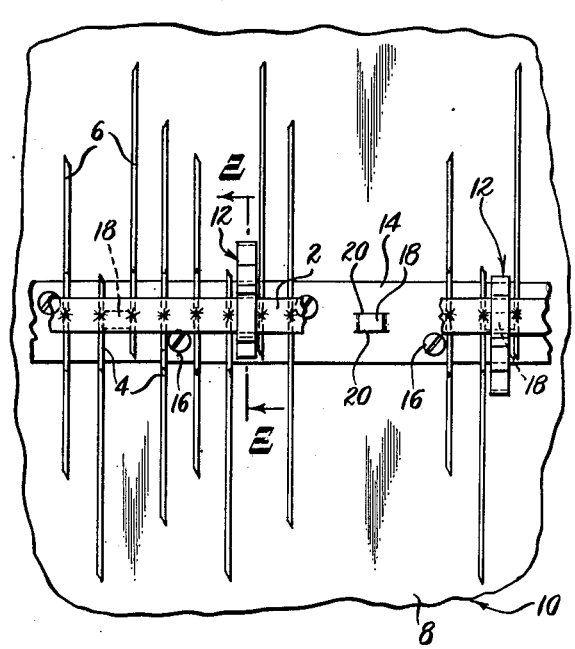
Fig. 1.
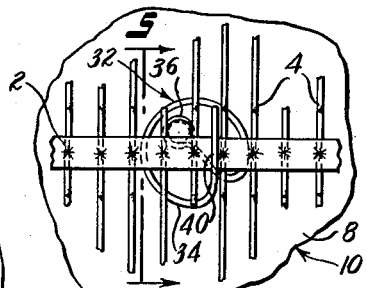
Fig. 4.
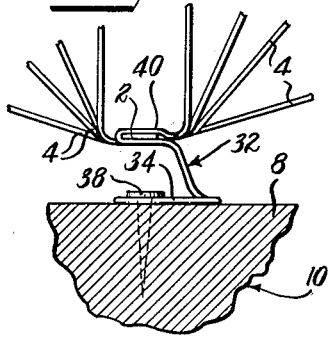
Fig. 5.
Fig. 2.
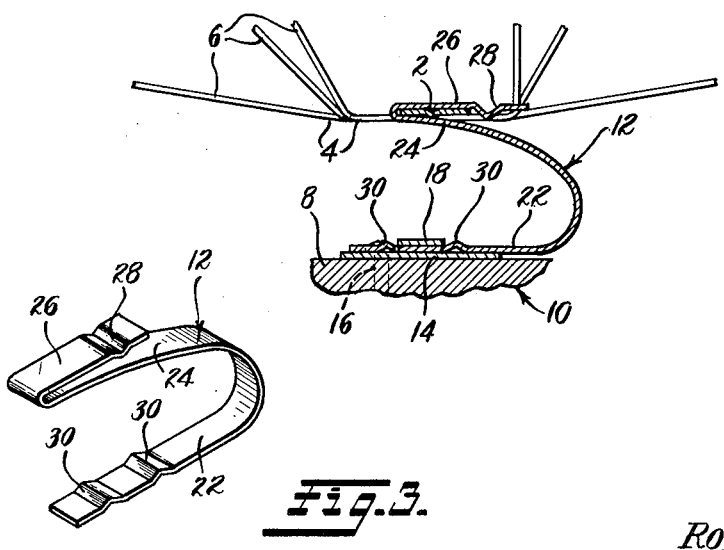
Fig. 3.
INVENTORS
Roy T. Moore
Marie A. Gellerstedt
BY
Bacon & Thomas
ATTORNEYS

United States Patent Office 3,191,239
Patented June 29, 1965

---

3,191,239
BIRD AND RODENT BARRIER CLIP
Roy T. Moore, Davenport, Iowa, and Marie A. Gellerstedt, Moline, Ill., assignors to Nixalite Company of America, Rock Island, Ill., a corporation
Filed Apr. 12, 1963, Ser. No. 272,597
7 Claims. (Cl. 20—1)

This invention relates to mounting means for a bird and rodent barrier and particularly to a resilient mounting clip for a barrier of the type disclosed in the patent of Charles B. Kaufmann, 2,888,716, and in the patent to Burnside et al., 2,777,171.

The present application discloses and claims an improvement of the clip described in the copending application of Roy T. Moore, one of the applicants herein, Serial No. 125,842, filed July 21, 1961.

The bird and rodent barrier disclosed in the above-mentioned patents has proven very effective, however, in certain instances birds have been known to alight on certain of the longer prongs or spines by grasping the sides thereof. The present invention provides a resilient mounting clip for the entire barrier to resiliently support the same above a base structure so that any attempt by a bird to alight on one of the prongs or spines will result in flexure of the support and vibration or displacement of the entire barrier, thus making it practically impossible for the bird to get a good foothold on the sides of the prong and rest its weight thereon.

The invention comprises a clip and/or the combination of the clip, supporting member and barrier wherein the barrier is supported by a plurality of spaced clips each having a formation for securement to a supporting member and a spring arm extending generally upwardly to a clip portion which engages and supports the barrier. Thus, the entire barrier is resiliently and flexibly mounted on a supporting structure and the objectives of the invention are thus achieved.

It is, therefore, an object of this invention to provide a novel resilient clip for mounting a bird and rodent barrier resiliently above a supporting surface.

Another object is to provide a clip of the type set forth that is provided with means whereby it may be securely mounted on any surface.

Another object is to provide a clip releasably engageable with a barrier structure and wherein the mounting clip may be permanently or removably mounted on a supporting member and yet the barrier structure may be removed for any desired purpose and the same or another barrier replaced with the same clips or new clips and wherein the spacing between clips may be changed to suit particular conditions.

An additional object of the invention is to provide a barrier mounting clip of extreme simplicity and economy of construction and yet of high reliability and efficient in operation.

Another and additional object is to provide a combination of bird and rodent barrier and mounting means whereby the barrier is resiliently and movably mounted above a supporting surface.

Further objects and advantages will become apparent to those skilled in the art as the description proceeds with reference to the accompanying drawings wherein:

FIG. 1 is a top plan view, with portions broken away, of a barrier and mounting means embodying the present invention;

FIG. 2 is a transverse sectional view taken along the line 2—2 of FIG. 1;

FIG. 3 is a perspective view of the resilient clip;

FIG. 4 is a fragmentary plan view of a modified form of spring clip, and;

FIG. 5 is a sectional view taken along the line 5—5 of FIG. 4.

FIG. 1 shows generally a bird and rodent barrier of the type fully disclosed in the patents mentioned heretofore. In general, however, the barrier comprises a base strip 2, preferably of stainless steel ribbon, to which transverse wires 4 are welded. The wires 4 are likewise preferably of a stainless steel material but are so processed as to have the characteristics of springs, that is, considerable flexibility yet highly resilient. The wires 4 extend transversely across the bottom of the base strip 2 and are welded thereto. The outer ends of the wires 4 are bent upwardly and outwardly in diverging relation and pointed at their outer ends. Thus, the ends of the wires define a mass of sharp prongs or spines extending upwardly and outwardly at all directions from the base strip 2. The exact shapes, lengths and relationships of the prongs or spines 6 is discussed in more detail in the mentioned patents, to which reference is made. It has previously been the custom to secure the base strip 2 directly or fixedly on a surface 8 of a supporting structure 10 wherein the barrier was substantially rigidly secured in the desired position. According to the present invention, however, the barrier structure is mounted on resilient spring clips 12 so as to be held spaced above the surface 8 and resiliently held in such spaced position so that the application of relatively small forces to the barrier will result in flexure of the clip structure to induce vibrations or other displacement of the barrier and thus render more difficult the landing of birds on any of the prongs.

A preferred form of supporting clip is shown in FIGS. 1 through 3 wherein a supporting member 14 is provided in the form of an elongated ribbon or strip of metal or the like. Preferably, stainless steel is employed but obviously the material could be of any other suitable nature. The strip 14 is provided with a plurality of longitudinally spaced openings through which screws 16 or other suitable securing means may be passed to secure the strip to the building structure 10 in the desired position. At regular intervals along its length the strip 14 is provided with upwardly struck loops 18 defined by opposed longitudinal slits 20. The loops 18 extend upwardly above the upper surface of strip 14 and are laterally open to define securing means for the supporting clips 12.

As most clearly shown in FIGS. 2 and 3, the supporting clips 12 are generally C-shaped and formed of spring metal, preferably stainless steel. Each clip is formed with a lower leg 22 and an upper leg 24. The upper leg 24 is provided with a reversely bent portion 26 overlying the free end of leg 24 and having a transverse downwardly convex corrugation 28 near its free end. As shown in FIG. 2, the portion 26 constitutes a spring clip that can be engaged over the base strip 2 of the barrier structure, anywhere along its length between the cross-wires 4. The structure is such that the base strip is securely but removably held by the clips 12.

The lower legs 22 of the clips 12 are each of generally flat configuration but provided with spaced transverse corrugations 30, which are spaced apart a distance substantially equal to the lateral width of the loops 18. Thus, the lower leg 22 of a clip may be projected through a selected loop 18, in the manner shown in FIG. 2. The resilience of the lower leg 22 permits sufficient compression of the corrugations 30 to facilitate snapping of the clip into the loops 18 and the corrugations then serve to properly position and removably secure the clips 12 on the supporting member 14.

Preferably, the loops 18 are struck from the strip 14 at approximately one inch intervals therealong although, in use, clips 12 are provided to support the barrier structure at intervals of from two to six inches apart. The spacing between clips in an actual installation depends upon a number of factors, including the weight of the particular birds it is desired to discourage from alighting on the building structure. For example, heavy birds would require that the clips be positioned fairly close together whereas, to discourage lighter birds, the clips can be spaced a greater distance apart, thus reducing the number required and increasing the effectiveness of the installation. In any event, the spacing between the clips 12 is so related to the distance between the base strip 2 and the supporting member 14 that the base strip 2 and barrier cannot be deflected downwardly far enough to engage the supporting member 14 under the weight of a bird which may alight between the clips. Due to the shape of the clips 12, any attempt by a bird to grasp one of the prongs and rest thereon will result in vertical flexure of the clips and base strip 2 and actual tilting of the base strip 2 to one side or the other and thus render the perch so insecure that the birds will not remain thereon.

FIGS. 4 and 5 illustrate a second embodiment of the invention, as disclosed in copending application Serial No. 125,842. In the form shown in FIGS. 4 and 5, the barrier structure is the same as that already described and comprises a flexible base strip 2 and the crosswires 4. In this form, however, the clips 32 are separately formed of spring wire or the like and are separately secured to the building structure 10. Each clip is formed with a generally circular base portion 34 and an eyelet 36 through which a nail or other fastening means 38 is passed to secure the clip to the building structure. From the circular base 34, the spring wire on the clip extends generally obliquely upwardly and its upper end defines a reversely bent spring clip 40 similar in structure and function to the spring clip portion 26 of FIGS. 1-3.

In both forms of clip disclosed herein, there is provided a base portion and a generally oblique upwardly extending portion terminating in a spring clip engageable with the barrier base strip 2. In each instance the clips can be installed at any desired spacing along the base strip 2 and the latter is readily removable therefrom when it is desirable or necessary to service the installation or to paint or otherwise maintain the underlying building structure. In the form of FIGS. 1-3, the spacing of the clips may be changed from time to time as conditions demand.

While a limited number of specific embodiments of the invention are shown and described herein, it is to be understood that the same are merely illustrative of the principles involved and that other embodiments may be resorted to within the scope of the appended claims.

We claim:

1. In combination; a barrier device having a flexible elongated and flat ribbon-like base member and a multiplicity of spaced upwardly diverging elongated resilient spines thereon; supporting clips spaced along said base member; said supporting clips each including a substantially flat base portion for attachment to a supporting structure, an upwardly extending spring arm angularly disposed relative to said base portion and holding means at the upper end of said arm engaging and holding said base member spaced a substantial distance above said base portions, said spring arm being sufficiently resilient to respond to small forces to induce vibration of the barrier device whereby birds will not be able to grasp and alight on said spines.

2. The combination defined in claim 1 wherein said spring arm extends generally obliquely upwardly from an edge of said base portion to said holding means and wherein said holding means overlies said base portion spaced a substantial distance thereabove.

3. The combination defined in claim 1 wherein said supporting structure comprises an elongated member having means spaced therealong releasably engaging and holding said base portions.

4. The combination defined in claim 1 wherein said supporting structure comprises an elongated supporting member having openings spaced therealong for attaching said member to a building structure; spaced attachment means along said supporting member; said base portions each having a lower generally horizontal leg removably held by one of said attachment means.

5. Means as defined in claim 4 wherein each supporting clip comprises a generally C-shaped member having reversely bent portion, said reversely bent portion overlying said upper leg.

6. Means as defined in claim 4 wherein said supporting member comprises a ribbon of metal having laterally open loops struck upwardly therefrom and constituting said attachment means, said lower legs extending into said loops.

7. Means as defined in claim 6 wherein at least said lower legs each comprises a generally flat ribbon of spring metal having an upwardly convex corrugation thereacross adjacent each side of its attachment loop whereby to releasably hold said lower leg in its loop.

References Cited by the Examiner

UNITED STATES PATENTS

| 215,320 | 5/79 | Cary et al. | 256—57 |
| 395,585 | 1/89 | Portmann | 267—5 |
| 1,173,998 | 2/16 | Depew | 217—93 |
| 1,590,400 | 6/26 | Widmer | 24—230 |
| 1,624,986 | 4/27 | Sherrod | 272—52 |
| 2,663,361 | 12/53 | Diamond | 189—35 |
| 2,888,716 | 6/59 | Kaufmann | 20—1 |
| 2,988,332 | 6/61 | Binetti et al. | 256—13.1 |

FRANK L. ABBOTT, *Primary Examiner.*

JACOB L. NACKENOFF, *Examiner.*